(12) United States Patent
Watkinson

(10) Patent No.: US 8,029,615 B2
(45) Date of Patent: Oct. 4, 2011

(54) CERAMIC PIGMENTS

(76) Inventor: Charles Watkinson, Yorkshire (GB)

( * ) Notice: Subject to any disclaimer, the term of this patent is extended or adjusted under 35 U.S.C. 154(b) by 0 days.

(21) Appl. No.: 12/513,152

(22) PCT Filed: Oct. 30, 2007

(86) PCT No.: PCT/GB2007/004137
§ 371 (c)(1),
(2), (4) Date: May 18, 2009

(87) PCT Pub. No.: WO2008/053198
PCT Pub. Date: May 8, 2008

(65) Prior Publication Data
US 2010/0064941 A1    Mar. 18, 2010

(30) Foreign Application Priority Data
Oct. 31, 2006   (GB) .................................. 0621627.9

(51) Int. Cl.
*C09C 3/00*     (2006.01)
*C09C 1/00*     (2006.01)
*C09C 1/28*     (2006.01)
*C09C 1/36*     (2006.01)

(52) U.S. Cl. ........ 106/415; 106/436; 106/438; 106/439; 106/450; 106/453; 106/456; 106/459; 106/489

(58) Field of Classification Search .................. 106/415, 106/436, 438, 439, 450, 453, 456, 459
See application file for complete search history.

(56) References Cited

U.S. PATENT DOCUMENTS

| 5,693,134 A | * | 12/1997 | Stephens | ....................... 106/415 |
| 5,753,371 A |   | 5/1998  | Sullivan et al. | |
| 6,221,144 B1 | * | 4/2001 | Dietz et al. | .................... 106/417 |
| 6,692,561 B1 |   | 2/2004 | Schoen et al. | |

FOREIGN PATENT DOCUMENTS

| DE | 199 51 869 A1 | 5/2001 |
| EP | 0719843 A1 | 7/1996 |

* cited by examiner

*Primary Examiner* — Anthony Green
(74) *Attorney, Agent, or Firm* — Edwin D. Schindler

(57) ABSTRACT

A pearlescent pigment includes a ceramic flake coated with a metal oxide. The metal oxide is, preferably, an oxide of titanium, iron, tin, chromium1, zirconium or a combination thereof, and the refractive index of the metal oxide coating is preferably at least 0.5 higher than that of the ceramic flake. The pearlescent pigment may be included in a coating applied to a metallic or plastic surface to give the surface a lustrous or pearlescent optical effect.

14 Claims, No Drawings

CERAMIC PIGMENTS

FIELD OF THE INVENTION

This invention relates to pigments which are intended to give a particular visual effect such as a metallic lustre.

BACKGROUND TO THE INVENTION

The use of metal oxide-coated platelets to form a basis of a pigment providing one or more of various visual effects, including a pearlescent lustre and a metallic lustre, has been disclosed in, for instance, Pigment Handbook, Vol. 1, Second Edition, pp 829-858 (John Wiley & Sons, N.Y. 1988).

U.S. Pat. No. 5,753,371 discloses a pearlescent pigment consisting essentially of flakes of C glass having a layer comprising iron oxide or rutile titanium dioxide thereon. The source for the rutile titanium dioxide is stated to be selected from titanium tetrachloride and titanyl sulphate.

While the glass baked pigment of U.S. Pat. No. 5,753,371 can be provided in a form which is a high quality, high lustre pearlescent pigment, it is relatively expensive to produce and there is a need for an alternative, preferably cheaper to produce, material which is of high quality.

STATEMENTS OF THE INVENTION

According to the present invention there is provided a pearlescent pigment comprising ceramic flake coated with a metal oxide.

It has been surprisingly found that the costs associated with producing oxide-coated ceramic flake are not particularly high. Given the relatively low costs of the raw materials, the overall cost of producing a ceramic flake based material compares well with that of a glass flakes material.

Furthermore, it has also been surprisingly found that a material based on ceramic flake gives optical properties which are at least as useful as those provided by a glass flake based material. In particular, a ceramic flake based material has a much better than expected lustre and indeed one which compares very well with that of the equivalent glass flake based material.

Furthermore, it has been found that a ceramic based material has a high mechanical stability and abrasion resistance. As a result, during processing of the material, the edges of the ceramic flake suffer little smoothing or "rounding off", thereby avoiding the reduction of lustre or sparkle during processing.

The term "ceramic flake" refers to a material which is different from glass because it crystallises when it cools from a liquid form. Typically ceramic flake is an inorganic, non-metallic material processed or used at high temperatures. Generally it includes one or more of oxides, nitrides, borides, carbides, silicides and sulphides. It may include inter-metallic compounds such as aluminides, beryllides, phosphides, antimonides and arsenides.

By way of example, a typical ceramic flake composition, of use in the present invention, may include calcium oxide, magnesium oxide, silicon dioxide, titanium dioxide and zirconium dioxide. Again by way of example, a specific composition for ceramic flakes produced in the present invention is 65% $SiO_2$, 19.5% CaO, 15% MgO and 0.5% $ZrO_2$. More broadly, a preferred ceramic flake composition of use in the present invention includes 50 to 70 wt % $SiO_2$, 15 to 25% CaO, 10 to 20% MgO and 0 to 1% $ZrO_2$.

A particular ceramic flake which may be used in the present invention is that available from Glassflake Limited under the name CERAFLAKE (or CERAMFLAKE).

The oxide coating is typically in the form of a thin film deposited on the surfaces of the flakes. The oxide may be any suitable oxide, including oxides of titanium, iron, tin, chromium and zirconium, as well as mixtures of two or more of these oxides.

The ceramic flakes used in the present invention may have a thickness of from 100 nm to 10 µm. The actual thickness used will depend on the particular application but often varying the thickness of glass flakes produces spectacular colour effects with high degree of 'sparkle' at high thicknesses but homogeneity of colour at low thicknesses.

The average particle size (planar) of the ceramic flakes used in the present invention may typically range from 10 to 1000 µm, a preferred range being from 20 to 100 µm. Preferably, the refractive index of the metal oxide coating is greater than that of the underlying ceramic flake. More preferably, the refractive index of the metal oxide coating is at least 0.5, more preferably at least 1.0 and most preferably at least 1.5, higher than that of the ceramic flake. Providing a bed oxide coating with a relatively high refractive index, compared with that of the ceramic flake, gives the overall product a particularly good lustre.

Pigments of the invention may be used as a relative application. By way of examples only, they may be used to provide coloured plastics, glasses, paints, cosmetics, so that a particular use of the pigments is as coatings, for instance, applied to automobiles as well as in inks, including printing inks.

The invention claimed is:

1. A pearlescent pigment, comprising:
    ceramic flakes having a single coating comprising a metal oxide, said coating having a refractive index that is at least 0.5 higher than that of said ceramic flakes, wherein said ceramic flakes has a composition that includes:
    50-70 wt % $SiO_2$;
    15-25 wt % CaO;
    10-20 wt % MgO; and
    0-1 wt % $ZrO_2$.

2. The pearlescent pigment according to claim 1, wherein the metal oxide is an oxide of a metal selected from the group consisting of titanium, iron, tin, chromium, zirconium and a combination thereof.

3. The pearlescent pigment according to claim 1, wherein said ceramic flakes have a thickness of from 100 nm to 10 µm.

4. The pearlescent pigment according to claim 1, wherein said ceramic flakes have a size of from 10 µm to 100 µm.

5. The pearlescent pigment according to claim 1, wherein said coating that includes the metal oxide has a refractive index that is at least 1.0 higher than that of said ceramic flakes.

6. The pearlescent pigment according to claim 1, wherein said ceramic flakes have a composition of:
    65 wt % $SiO_2$;
    19.5 wt % CaO;
    15 wt % MgO; and
    0.5 wt % $ZrO_2$.

7. The pearlescent pigment according to claim 1, wherein said coating that includes the metal oxide has a refractive index that is at least 1.5 higher than that of said ceramic flakes.

8. A method for providing a lustrous or pearlescent optical effect to a metallic surface or a plastic surface, comprising the step of:
    coating a metal surface or a plastic surface with a pigment having ceramic flakes that include a single coating comprising a metal oxide, said coating having a refractive index that is at least 0.5 higher than that of said ceramic flakes, wherein said ceramic flakes has a composition that includes:
50-70 wt % $SiO_2$;
15-25 wt % CaO;
10-20 wt % MgO; and
0-1 wt % $ZrO_2$.

9. The method for providing a lustrous or pearlescent optical effect to a metallic surface or a plastic surface according to claim 8, wherein the metal oxide is an oxide of a metal selected from the group consisting of titanium, iron, tin, chromium, zirconium and a combination thereof.

10. The method for providing a lustrous or pearlescent optical effect to a metallic surface or a plastic surface according to claim 8, wherein said ceramic flakes have a thickness of from 100 nm to 10 μm.

11. The method for providing a lustrous or pearlescent optical effect to a metallic surface or a plastic surface according to claim 8, wherein said ceramic flakes have a size of from 10 μm to 100 μm.

12. The method for providing a lustrous or pearlescent optical effect to a metallic surface or a plastic surface according to claim 8, wherein said coating that includes the metal oxide has a refractive index that is at least 1.0 higher than that of said ceramic flakes.

13. The method for providing a lustrous or pearlescent optical effect to a metallic surface or a plastic surface according to claim 8, wherein said ceramic flakes have a composition of:
65 wt % $SiO_2$;
19.5 wt % CaO;
15 wt % MgO; and
0.5 wt % $ZrO_2$.

14. The method for providing a lustrous or pearlescent optical effect to a metallic surface or a plastic surface according to claim 8, wherein said coating that includes the metal oxide has a refractive index that is at least 1.5 higher than that of said ceramic flakes.

* * * * *